3,250,672
NITROGUANIDINE FUNGICIDE
Robert G. Baker, Huntington Beach, Calif., assignor to The Dow Chemical Company, Midland, Mich., a corporation of Delaware
No Drawing. Filed June 15, 1964, Ser. No. 375,358
5 Claims. (Cl. 167—22)

The present invention relates to plant husbandry and the raising of crops and is particularly concerned with an agronomical practice and composition for improving the emergence, seed germination, seedling growth and harvest of crop plants.

It is an object of the present invention to provide an improved and novel agronomical practice for the raising and protection of crops. A further object is to protect plants and plant parts such as seeds, fruit, tubers, foliage, roots, etc., from the attacks of the fungal organisms of blight, rust, scab, rot and damping-off. An additional object is the provision of a method for protecting the roots of plants against the attack of soil-dwelling fungi. A further object is the provision of a novel composition adapted to be employed in the new practice for protecting and benefiting crops. Other objects will become apparent from the following specification and claims.

In carrying out the method of the present invention, the undesirable fungi can be controlled by contacting the fungal organisms and/or their habitat with a fungicidal amount of 1-methyl-3-nitro-1-nitrosoguanidine or 1-ethyl-3-nitro-1-nitrosoguanidine. Such practice controls the fungi which attack the above ground portions of plants, including seeds and fruits, as well as the soil dwelling fungi which attack the underground portions of plants such as roots and tubers. Thus, the new practice improves the emergence and growth of seedlings and the crop harvest.

1-methyl-3-nitro-1-nitrosoguanidine is an odorless, light orange crystalline solid which melts with decomposition at 118° C. 1-ethyl-3-nitro-1-nitrosoguanidine is a crystalline solid which melts at 114.5° C. with decomposition. These compounds are somewhat soluble in many common organic solvents and water and are adapted readily and conveniently to be distributed in the soil or in or upon other growth media. When distributed in the growth media, the compounds accomplish a rapid control of the fungal organisms which attack plant roots, plant foliage, seeds and other plant parts. A particularly outstanding advantage of the present invention is that the 1-methyl-3-nitro-1-nitrosoguanidine and 1-ethyl-3-nitro-1-nitrosoguanidine materials are of very high toxicity to fungal plants and of very low toxicity to terrestrial plants. Thus, the guanidine materials can be applied to fungal organisms or their habitats in fungicidal amounts to obtain excellent controls of many fungal organisms which attack the seeds, roots or above-ground parts of terrestrial plants without causing damage to the plants or plant parts. Such practice protects the desirable plants or their seeds from the ravages of plant attacking fungi and improves the crop yield as well as the emergence and growth of seedlings without substantial injury. The above stated characteristic is advantageous in that it eliminates the undesirable waiting period between the treating of the soil and the seeding or transplanting of a plant crop. It is a further advantage that the compound permeates the soil for a short distance from the point of application depending upon the temperature, moisture content, compactness and physical consistency of the soil. Additionally, the compounds or compositions containing the compounds can be applied in dormant applications to the woody surfaces of terrestrial plants or to orchard floor surfaces to obtain excellent controls of the overwintering fungal spores.

The treatment of fungal organisms and/or their habitats with effective or fungicidal amounts of either 1-methyl-3-nitro-1-nitrosoguanidine or 1-ethyl-3-nitro-1-nitrosoguanidine is critical and essential for the practice of the present invention. For the remainder of this specification the term "1-alkyl-3-nitro-1-nitrosoguanidine" will be employed to represent 1-methyl- and 1-ethyl-3-nitro-1-nitrosoguanidine. In applications to orchard floor surfaces and the above ground parts of plants, good controls and kills of fungal organisms are obtained when the 1-alkyl-3-nitro-1-nitrosoguanidine is applied at a dosage of at least 20 parts per million by weight in the spray. In applications to soil for the control of root-attacking fungi, good results are obtained when the 1-alkyl-3-nitro-1-nitrosoguanidine is supplied in the soil in the amount of at least 5 parts by weight per million parts of soil. In applications to field soil, good results are obtained when the 1-alkyl-3-nitro-1-nitrosoguanidine is distributed at a rate of from about 10 to 25 pounds or more per acre and through such cross section of the soil as to provide for the presence therein of an effective concentration of the treating agent. Oftentimes it is desirable to distribute the compound to a depth of at least 25 inches to avoid reinfestation of the soil by the deep dwelling fungal organisms. In applications to the furrow-seed row for the suppression of seedling disease, it is desirable that the compound be distributed upon the surface of the furrow at a dosage of at least 0.5 pound per acre of furrow soil surface. After such treatment, the furrow is seeded and the soil compacted about the seed according to conventional practice. In the row treatment of existing vegetation, the product can be employed with known side-dressing techniques. When either of the compounds or a mixture of the compounds is employed to protect seeds against fungal attack it is desirable to apply the compound or compounds to the seeds in compositions containing the compound or compounds in such amounts as to furnish at least 0.07 of an ounce per 100 pounds of seeds.

The method of the present invention can be carried out by employing the unmodified compounds singly or in combination with each other. However, the present method also embraces the employment of a liquid or dust composition containing the compound or compounds. In such usage, the compound or compounds can be modified with one or more of a plurality of additaments or parasiticide or fungicide adjuvants including solvents or other liquid carriers, surface active dispersing agents or finely divided inert solids. Such augmented compositions are adapted to be distributed upon the fungal organisms or their habitats. The augmented compositions are also adapted to be employed as concentrates and subsequently diluted with additional inert carrier, to produce other compositions in the form of dusts, sprays, washes or drenches. In compositions where the adjuvant is a finely divided solid, a surface active agent or the combination of a surface active agent and a liquid additament, the adjuvant cooperates with the active component so as to facilitate the invention and obtain an improved and outstanding result.

The exact concentration of the compound to be employed in compositions for the treatment of fungi or their habitats can vary provided the required dosage of effective agent is supplied on the fungal organism or in its habitat. The concentration of toxicant in liquid compositions employed to supply the desired dosage generally is from about 0.0001 to 50 percent by weight, although concentrations as high as 90 percent by weight are sometimes employed. In dusts, the concentration of the effective agent is usually from about 1 to 20 percent by weight. In compositions to be employed as concentrates, the compounds can be present in concentrations of about 5 to 98 percent by weight.

The exact concentration of the 1-alkyl-3-nitro-1-nitrosoguanidine compound to be employed in the treating compositions is not critical and may vary considerably provided the required dosage of the effective agent is supplied in the growth medium or upon the plant foliage. The concentration of the toxicant or toxicants in liquid compositions employed to supply the desired dosage generally is from about 0.06 to 50 percent by weight, although concentrations as low as 0.00005 percent and as high as 90 percent by weight are sometimes advantageously employed. In dusts, the concentration of toxicant or toxicants is from about 0.1 to 90 percent by weight and usually not in excess of about 20 percent. In both liquid and dust compositions to be employed as concentrates, the toxicant or toxicants can be present in a concentration of from 5 to 98 percent by weight.

Liquid compositions containing a desired amount of the effective agent can be prepared by dissolving the toxicant or toxicants in an organic liquid such as acetone, methylene chloride, chlorobenzene, and petroleum distillates or by dispersing the toxicant or toxicants in water with or without the aid of a suitable surface active dispersing agent such as an ionic or nonionic dispersing and emulsifying agent. The preferred organic solvent carriers are those which are adapted to accomplish the penetration and impregnation of the soil with the toxicant compound, and are of such volatility as to evaporate therefrom and leave little permanent residue therein. Particularly desirable carriers are the petroleum distillates boiling almost entirely under 400° F. at atmospheric pressure and having a flash point of about 80° F.

The aqueous compositions to be employed in the present method can contain one or more water immiscible solvents for the compound. In such compositions, the carrier comprises an aqueous emulsion, i.e., a mixture of water immiscible solvent, emulsifying agent and water. The choice of dispersing and emulsifying agents and the amount thereof employed is dictated by the nature of the composition type and by the ability of the agent to facilitate the dispersion of the effective agent in the aqueous carrier to produce the desired composition. Dispersing and emulsifying agents which can be employed in the compositions include the concentration products of alkene oxides with phenols and organic acids, alkyl aryl sulfonates, polyoxyethylene derivatives of sorbitan esters, complex ether alcohols, mahagony soaps and the like.

In the preparation of the dust compositions, the compounds are dispersed in and on a finely divided solid such as talc, chalk, gypsum, vermiculite and the like. In other operations, the finely divided carrier is mixed with the toxicant or toxicants or a solution thereof in a volatile organic solvent. Similarly, dust compositions containing the compound can be prepared from various solid surface active dispersing agents such as bentonite, fuller's earth, attapulgite and other clays. Depending upon the proportion of the ingredients, these dust compositions can be employed as concentrates and subsequently diluted with additional solid surface active dispersing agents or with talc, chalk, gypsum, vermiculite and the like, to obtain the desired amount of the active ingredient in a composition adapted to be applied to fungi or distributed in the habitats. Also, such concentrate dust compositions can be dispersed in water, with or without the aid of a dispersing agent, to form aqueous compositions adapted for similar employment.

In a further method, the distribution can be accomplished by introducing a toxicant or toxicants in the water employed to irrigate the soil. In this method the amount of water can be varied in accordance with the moisture equivalent or field capacity of the soil in order to obtain the desired depth of distribution of the toxicant and the soil moisture content equal to the moisture equivalent. When operating in accordance with such methods, toxicant distributions to a depth of 2 to 4 feet or more can be conveniently obtained.

The following examples illustrate the invention but are not to be construed as limiting the same:

*Example 1*

Acetone solutions containing 2 grams of 1-methyl-3-nitro-1-nitrosoguanidine per liter of ultimate solution are employed for the treatment of a sandy loam soil heavily infested with the organisms *Fusarium solani*, Pythium spp. and *Rhizoctania solani*. In the treating operations, the soil is placed in sealable containers and separately injected with the acetone compositions in an amount sufficient to supply 12.5 parts by weight of 1-methyl-3-nitro-1-nitrosoguanidine per million parts of soil. In further operations, sealed containers containing the same infested soil in quantities equal to those used above are treated with acetone per se in equivalent amounts to serve as checks. Following the treatments, the containers of soil are incubated at an average temperature of 25° C.

After three days, the containers are opened and the portions of the treated and untreated soil cultured by the dilution plate method described by J. P. Martin in Soil Science, 69, No. 3, pages 215–32 (March 1950) to determine the percent control of fungal organisms. In the latter operations, the culture medium employed is a peptone-dextrose agar (1000 milliliters of water, 10 grams of dextrose, 5 grams of peptone, 1 gram of potassium dihydrogen phosphate, 0.5 gram of $MgSO_4 \cdot 7H_2O$ and 20 grams of agar) containing 0.069 gram of rose begal and 0.030 gram of tetramyacin per liter of ultimate mixture. In the plating operations, the culturing medium is incorporated with 0.5 gram of soil sample per liter of medium and the plates thereafter poured in replicates of three for the treated and check soils. The poured plates are then incubated for three days at 25° C.

After incubation, the plates are examined and the counts of fungal colonies made in order to determine the percent control and kill of the fungal organisms. The examination shows a 90 percent control and kill of the fungal organisms in the soil treated with 1-methyl-3-nitro-1-nitrosoguanidine. At the time of observation, the check soil is found to be heavily infested with the named fungal organisms.

*Example 2*

In an operation carried out exactly the same manner as Example 1, 1-ethyl-3-nitro-1-nitrosoguanidine (32 grams per liter of ultimate solution) is employed in amounts sufficient to supply 20 parts by weight of the toxicant per one million parts of soil. The 1-ethyl-3-nitro-1-nitrosoguanidine compound gives substantially complete kill of *Fusarium solani*, Pythium spp. and *Rhizoctania solani*.

*Example 3*

In a further operation, 1-methyl-3-nitro-1-nitrosoguanidine is again employed for the treatment of soil heavily infested with *Fusarium solani*, Pythium spp. and *Rhizoctania solani*. In the treating operations, the infested soil is placed in sealable jars and thereafter injected with aqueous solutions containing 6 and 3 grams of the toxicant compound per liter of ultimate mixture and in amounts sufficient to supply, respectively, 10 and 5 parts by weight of toxicant per million parts by weight of soil.

Immediately after treatment, the soil in the jars is seeded to cotton, the jars thereafter sealed and the seeded soil therein mechanically mixed to insure uniform distribution of the toxicant composition. In a check operation, the same infested but untreated soil is placed in jars, the soil seeded with cotton seeds and the jars thereafter sealed. Three days after seeding, the check and treated jars are opened, sufficient water added to each jar to insure seedling growth and the jars immediately sealed. During the subsequent period of growth, there is observed no adverse effect upon the germination and growth of seedlings attributable to the toxicant compound. Ten days after seeding, the jars are opened, and the seedlings removed and the roots examined in order to determine the number of disease-free plants. The roots of the plants grown in the soil treated with 1-methyl-3-nitro-1-nitrosoguanidine, are found to be free of disease attributable to the complex of root rot fungi. The roots and seeds of the check seeds are found to be covered with the lesions of the root rot fungi.

Example 4

Acetone compositions containing 1-methyl-3-nitro-1-nitrosoguanidine at concentrations of 2 and 1 grams of chemical per liter of acetone are employed for the treatment of cotton seeds to protect the seeds from the attack of the organisms of rot and damping-off. In the treating operations, the cotton seeds are uniformly wet with the composition in an amount sufficient to supply 0.14 or 0.07 ounce of 1-methyl-3-nitro - 1 - nitrosoguanidine per 100 pounds of seeds. Following the wetting of the seeds, they are completely dried to remove the acetone portion of the composition and leave the nitrosoguanidine compound on the seed as a residue. Following the treatment, the cotton seeds are planted in seed beds of sandy loam soil which contain a heavy infestation of Pythium spp. and *Rhizoctania solani*. In a further operation, seeds are treated with acetone, per se, in equivalent amounts and planted in similarly infested seed beds to serve as checks.

After ten days, the seed beds are examined to determine the percentage of seedlings which have emerged. In the seed beds planted with seeds treated with 1-methyl-3-nitro-1-nitrosoguanidine there is found to be substantially complete emergence of the seedlings. At the time of these observations, there is found substantially no emergence of seedlings in the check beds, with the roots of the few scattered seedlings being covered with the lesions of the root rot fungi.

Example 5

Aqueous-acetone compositions containing .04 and .01 gram of 1-methyl-3-nitro-1-nitrosoguanidine per liter of ultimate mixture are combined with viable sporangia of *Phytophthora infestans*. The toxicant-organism mixture is then sprayed upon tomato plants to the point of run-off. Another group of tomato plants, the check group, are sprayed with compositions which contain the sporangia of *Phytophthora infestans* but do not contain the 1-methyl-3-nitro-1-nitrosoguanidine. Following the inoculation, the plants are placed in a moist chamber and maintained at 70° F. under saturated humid conditions for 24 hours. Thereafter, the plants are set aside under greenhouse conditions for 48 hours and then observed for the development of tomato late blight disease. The quantities of 1-methyl-3-nitro-1-nitrosoguanidine compound employed together with the results obtained therewith in the described operations are set forth in the following table:

| Concentration of Toxicant Compound in Grams per liter of Ultimate Solution | Concentration of Treating Compound in Solution in Parts by Weight per Million Parts by Weight of Solution | Percent Kill of *Phytophthora infestans* |
|---|---|---|
| .04 | 40 | 90 |
| .01 | 10 | 90 |
| 0 | 0 (untreated check) | 0 |

At the time of the observations, the leaves of the untreated check plants are found to be covered with the lesions of tomato late blight.

In an analogous operation, aqueous-acetone dispersions containing 1-ethyl-3-nitro-1-nitrosoguanidine at a concentration of 40 parts per million by weight gave 75 percent kill of *Phytophthora infestans*.

Example 6

Separate aqueous compositions, each containing .0005 gram of 1-methyl-3-nitro-1-nitrosoguanidine compound or .0005 gram of 1-ethyl-3-nitro-1-nitrosoguanidine compound per liter of ultimate mixture are applied to the point of run off, to the above ground portions of apple seedlings. These seedlings are then inoculated with the aqueous dispersions containing viable causative organisms of apple scab, Venturia inequalis. Other apple seedlings, the checks, are merely inoculated with the causative organisms of apple scab. All of the apple seedlings are observed until the check seedlings showed the symptoms of apple scab, whereupon the trees sprayed with the toxicant compound are examined to determine if they show symptoms of the apple scab disease. It is discovered that aqueous compositions containing 1-methyl-3-nitro-1-nitrosoguanidine or 1-ethyl-3-nitro-1-nitrosoguanidine at concentrations of .5 part per million by weight give complete control and kill of the viable organisms of apple scab.

Example 7

(A) Twenty-five parts by weight of 1-methyl-3-nitro-1-nitrosoguanidine, or 1-ethyl-3-nitro-1-nitrosoguanidine, 70 parts of fuller's earth, 2 parts of an alkyl aryl sulfonate (Nacconol NR) and 3 parts of a polymerized sodium salt of a substituted benzoid alkyl sulfonic acid (Daxad No. 27) are mechanically mixed and ground together to prepare a concentrate composition in the form of a wettable powder.

(B) Also, 25 parts by weight of 1-methyl-3-nitro-1-nitrosoguanidine, or 1-ethyl-3-nitro-1-nitrosoguanidine, 70 parts of xylene and 5 parts of diameric alkylated aryl polyether alcohol (Triton X–155) are mechanically mixed together to prepare a liquid emulsifiable concentrate composition.

(C) In a further operation, 94 parts by weight of 1-methyl-3-nitro-1-nitrosoguanidine or 1-ethyl-3-nitro-1-nitrosoguanidine and 6 parts of a polyoxyethylene sorbitol laurate (Atlox 1045) are mechanically mixed together to prepare a concentrate composition in the form of a dispersible liquid.

These concentrate compositions are dispersed in water to prepare aqueous compositions which have very desirable wetting and penetrating properties. The resulting aqueous compositions are adapted to be applied to fungal organisms or their habitats for fungal control. In addition these aqueous compositions are applied to obtain excellent distributions of the toxicant compound therein in fungicidal concentrations.

Example 8

The emulsifiable concentrate compositions of Example 7 is dispersed in water to prepare a composition containing 100 pounds of 1-methyl-3-nitro-1-nitrosoguanidine or 1-ethyl-3-nitro-1-nitrosoguanidine per 200 gallons of ultimate mixture. The latter composition while under agitation is metered into irrigation water at the pump outlet at the rate of 4 gallons per 1000 gallons of the irrigation water. The water is in a state of turbulent flow as it comes from the pump thus providing a thorough mixing of the toxicant composition therein. About three inches of the irrigation water is applied to a sandy loam soil heavily infested with Pythium spp., *Fusarium solani* and *Rhizoctania solani*. This treatment accomplishes a wetting of the soil to a depth of about 2 feet to provide a concentration of about 18 parts by weight of the toxicant compound per million parts by weight of soil. One week following the irrigation, the soil is seeded to lima beans. Four weeks after seeding, the resulting stand of bean plants is examined and found to be substantially free of fungal disease.

The compounds employed in the present invention are prepared by known methods wherein N-methyl-N'-nitroguanidine or N-ethyl-N'-nitroguanidine is dissolved in a strong acid such as sulfuric acid or nitric acid. The acid solution is then diluted with water and a solution of alkali metal nitrite added with stirring to the diluted acid solution. The crystalline product which forms during the addition of the alkali is then separated by conventional procedures such as filtration or decantation.

I claim:
1. A method which comprises exposing fungi and their habitats to a fungicidal amount of a member of the group consisting of 1-methyl-3-nitro-1-nitrosoguanidine and 1-ethyl-3-nitro-1-nitrosoguanidine.
2. A method which comprises applying to fungi and their habitats a fungicidal amount of a composition including a member of the group consisting of 1-methyl-3-nitro-1-nitrosoguanidine and 1-ethyl-3-nitro-1-nitrosoguanidine in admixture with a fungicide adjuvant.
3. A method which comprises exposing fungi and their habitats to a fungicidal amount of a composition containing 1-methyl-3-nitro-1-nitrosoguanidine and 1-ethyl-3-nitro-1-nitrosoguanidine.
4. A method which comprises exposing fungi and their habitats to a fungicidal amount of 1-methyl-3-nitro-1-nitrosoguanidine.
5. A method which comprises exposing fungi and their habitats to a fungicidal amount of 1-ethyl-3-nitro-1-nitrosoguanidine.

References Cited by the Examiner
UNITED STATES PATENTS
3,140,231   7/1964   Luskin _____ 167—22 XR OTHER REFERENCES
Chemical Abstracts 55: 7540e (1961).

JULIAN S. LEVITT, Primary Examiner.
J. D. GOLDBERG, Assistant Examiner.